United States Patent Office 2,879,254
Patented Mar. 24, 1959

2,879,254

COPOLYMERIZATION OF ACRYLONITRILE AND ANOTHER MONOMER IN THE PRESENCE OF PREFORMED POLYMERS AND PRODUCTS OBTAINED THEREBY

Harry W. Coover, Jr., and John R. Caldwell, Kingsport, Tenn., assignors to Eastman Kodak Company, Rochester, N.Y., a corporation of New Jersey No Drawing. Application February 3, 1954
Serial No. 408,013

8 Claims. (Cl. 260—45.5)

This invention relates to modified polyacrylonitriles and to a process for their preparation.

This application is a continuation-in-part of our copending application Serial No. 316,053, filed October 21, 1952 (now abandoned).

In copending application Serial No. 164,854, filed May 27, 1950 (now United States Patent No. 2,649,434, dated August 18, 1953) of Coover and Dickey, it is shown that valuable polymer products can be obtained by polymerizing acrylonitrile in the presence of preformed "live" homopolymers of various unsaturated monomeric compounds, i.e., homopolymers which have not been separated from their polymerization reaction mixtures, the acrylonitrile being then added to the mixtures and the polymerization continued to completion. In copending application Serial No. 198,761 (now United States Patent No. 2,620,324, dated December 2, 1952), filed December 1, 1950, of Coover and Dickey, it is shown that still other valuable polymer products can be obtained by polymerizing acrylonitrile in the presence of "dead" homopolymers and copolymers, of various unsaturated monomeric compounds, i.e., polymers which have been isolated first and then acrylonitrile polymerized in the presence of the isolated polymer. In copending application Serial No. 198,762, filed December 1, 1950 (now United States Patent No. 2,657,191, dated October 27, 1953) of Coover and Dickey, it is shown that still other valuable polymer products can be obtained by polymerizing acrylonitrile in the presence of "live" interpolymers of various unsaturated monomeric compounds. The processes used in the above pending applications are all concerned with the homopolymerization of acrylonitrile in the presence of a preformed polymer. Modified acrylonitrile polymers of this kind can be spun into fibers having greatly increased moisture absorption and dyeability. Such fibers have in addition, all the other desirable physical properties exhibited by fibers produced from straight polyacrylonitrile. They can readily be dry or wet spun into high strength fibers exhibiting various degrees of extensibility depending upon the extent to which and the conditions under which the fibers were drafted. For example, if the fibers are drafted over a range of 100–600% and relaxed, the extensibility of the yarn will increase something on the order of 30% at low drafts down to 17 or 18% at high drafts. Under the maximum drafting and relaxing conditions, it is not possible with these polymers to obtain fibers having extensibility exceeding 30% and still retaining tenacity in the order of 2.5–3.0 grams per denier. However, from a textile point of view, it would be highly desirable to be able to produce fibers having not only the outstanding properties such as moisture absorption, dye affinity, and other valuable physical properties, but also an extensibility in the range of 30–50%.

Polymers prepared according to the processes of the above pending applications can be dissolved in common acrylonitrile polymer solvents up to a limit of about 20% solids to give dopes which are practical for high-temperature dry spinning or wet spinning processes. Higher concentrations of these polymers cannot be used due to the tendency of the polymer solutions or dopes to set up in the form of a gel. However, from a production point of view, it is highly desirable to be able to prepare dopes containing higher concentrations of polymer, i.e., 25% or higher, because such higher solids dopes make it possible to produce fibers at a much faster rate. Furthermore, higher solids solutions would be more practical in that less solvent is required per pound of polymer; also the actual spinning costs are less in that less solvent per pound of spun fiber has to be extracted in the wet spinning process or volatized in a dry spinning process. Another consideration is that in wet or dry spinning processes, especially for high solids dopes, it is necessary to filter the solution free of extraneous materials and gelled particles that may be present so that they will not plug the spinneret. To facilitate filtration, it is necessary to maintain solution temperatures sufficiently high to dissolve completely the polymer and give a homogeneous solution. However, it is well known that solutions of acrylonitrile polymers discolor on heating, which results in poor yarn color. Accordingly, from a product and high quality yarn point of view, it would be highly desirable to provide an acrylonitrile polymer which could be dissolved to give dopes having solids content substantially greater than 25% which at the same time could be filtered at relatively low temperatures, thereby making it possible to produce yarn at lower costs and having greatly improved color.

We have now made the unusual and valuable discovery that when small amounts of one or more modifying unsaturated monomers are copolymerized with acrylonitrile in the presence of certain "dead" modifying polymers, the products obtained show not only good moisture absorption and dyeability, but other greatly improved properties which are especially valuable for textile purposes. For example, we have found that polymers prepared in accordance with the invention are much more readily soluble in acrylonitrile polymer solvents, and that their solutions or dopes can be made up to contain from 25–40% polymer solids, and that such dopes remain clear, flowable and filterable without any gelling at temperatures below 100° C., in contrast to hitherto known high solids acrylonitrile polymer dopes which still exhibit gelling effects at temperatures substantially above 100° C., for example 110° C. or even higher, and result, in discolored fiber and yarn. Furthermore, when the polymers of the invention are spun either by dry spinning or wet spinning processes, the fibers obtained can be more readily drafted and exhibit greatly improved extensibility for any given tenacity, i.e., in the range of 40–50 percent.

It is, accordingly, an object of the invention to provide a new class of modified acrylonitrile polymers or compostions. Another object is to provide a process for preparing these new polymers. Still another is to provide homogeneous solutions having a polymer solids content of from about 25–40 percent based on the total weight of the solution. A further object is to provide improved fibers from these compositions and from solutions thereof. Other objects will become apparent hereinafter.

In accordance with the invention, we prepare our new compositions or polymers by copolymerizing from 5 to 95 parts by weight of a mixture comprising as the sole polymerizable components from 85.0 to 99.5 percent by weight of acrylonitrile and from 15.0 to 0.5 percent by weight of one or more other monoethylenically unsaturated, polymerizable compounds containing a I. 

group, or more especially a

II. 

group, in the presence of from 95 to 5 parts by weight of a homopolymer or interpolymer of monomers selected from the group consisting of acrylamides, maleamides, fumaramides, itaconamides, citraconamides, maleamates, citraconamates, acrylates and vinyl carboxylic esters, the said interpolymer consisting of from 1 to 99, but preferably from 5 to 95, percent by weight of any one of the above monomers and from 99 to 1, but preferably from 95 to 5, percent by weight of a different monomer selected from the above group of monomers, or acrylonitrile. The acrylamides provide modifying polymers which are especially useful in practicing our invention. Those of my new compositions which contain from 60 to 95 percent by weight of acrylonitrile have been found to be especially useful as fiber-forming materials. However, all of our compositions in the 5 to 95 percent range of acrylonitrile content are compatible with each other, with polyacrylonitrile and with other acrylonitrile polymers containing 85 percent or more by weight of acrylonitrile, in all proportions, but the most useful mixtures comprise from 5 to 95 parts by weight of one or more of the polymers of the invention with from 95 to 5 parts by weight of polyacrylonitrile. Monomers, whose polymers were not heretofore compatible with polyacrylonitrile can thus be polymerized according to our invention to give polymers which are highly compatible with polyacrylonitrile.

The acrylamides whose polymers can be advantageously used in our invention comprise those represented by the following general formula:

III. 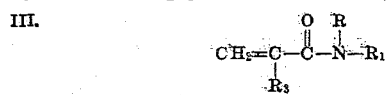

wherein one of R and $R_1$ represents a hydrogen atom or an alkyl group containing from 1 to 4 carbon atoms (e.g. methyl, ethyl, propyl, isopropyl, butyl, isobutyl, etc. groups), the other of R and $R_1$ represents an alkyl group containing from 1 to 4 carbon atoms, such as those just referred to, and $R_3$ represents a hydrogen atom or a methyl group. Typical acrylamides include N-methyl acrylamide, N-ethyl acrylamide, N-isopropyl acrylamide, N-n-butyl acrylamide, N-methyl methacrylamide, N-ethyl methacrylamide, N-isopropyl methacrylamide, N,N-dimethyl acrylamide, N,N-diethyl acrylamide, N,N-dimethyl methacrylamide, N-methyl ethacrylamide, α-propyl acrylamide, N-methyl α-butyl acrylamide, etc.

As maleamides, we can advantageously use those represented by the following general formula:

IV. 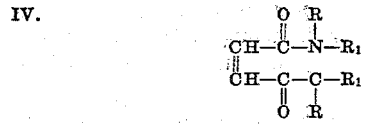

wherein R and $R_1$ are as above defined. Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N',N'-diethyl maleamide, etc.

As fumaramides, we can advantageously use those represented by the following general formula:

V. 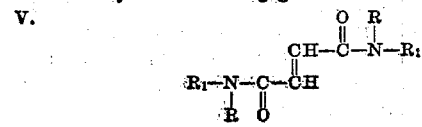

wherein R and $R_1$ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'-butyl fumaramide, N,N'-tetramethyl fumaramide, N,N'-tetraethyl fumaramide, N,N-dimethyl-N',N'-diethyl fumaramide, etc.

As itaconamides, we can advantageously use those represented by the following general formula:

VI. 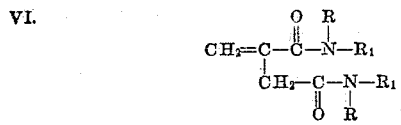

where R and $R_1$ are as above defined. Typical itaconamides include itaconamide, N-methyl itaconamide, N-ethyl itaconamide, N-n-butyl itaconamide, N,N'-dimethyl itaconamide, N,N'-diethyl itaconamide, the N,N'-butyl itaconamides, N,N'-tetramethyl itaconamide, etc.

As citraconamides we can advantageously use those represented by the following general formula:

VII. 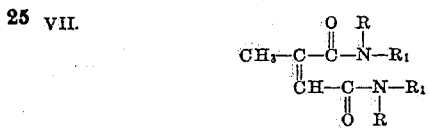

wherein R and $R_1$ are as above defined. Typical citraconamides include citraconamide, N-methyl citraconamide, N-ethyl citraconamide, N-n-butyl citraconamide, N,N'-dimethyl citraconamide, N,N'-diethyl citraconamide, the N,N'-butyl citraconamides, N,N'-tetramethyl citraconamide, etc.

The maleamates whose polymers we can advantageously use comprise those represented by the following general formula:

VIII. 

wherein R and $R_1$ are as above defined and $R_2$ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously use those represented by the following general formula:

IX. 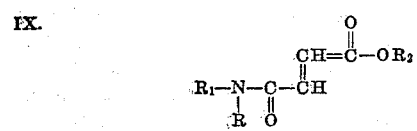

wherein R, $R_1$ and $R_2$ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, we can advantageously use those represented by the following general formulas:

X. 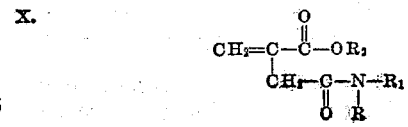

and

XI.

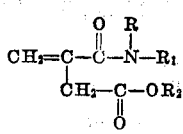

wherein R, $R_1$ and $R_2$ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamate, etc.

As citraconamates, we advantageously use those represented by the following general formulas:

XII.

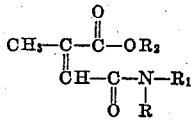

and

XIII.

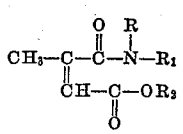

wherein R, $R_1$ and $R_2$ are as above defined. Typical citraconamates include methylcitraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

The acrylates whose polymers we can advantageously use comprise those represented by the following general formula:

XIV.

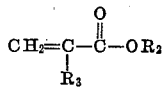

wherein $R_2$ and $R_3$ are as above defined. Typical esters include methyl acrylate, ethyl acrylate, propyl acrylate, n-butyl acrylate, isobutyl acrylate, methyl methacrylate, ethyl methacrylate, propyl methacrylate, the butyl methacrylates, etc.

As vinyl carboxylic esters, we can advantageously use those represented by the following general formula:

XV.

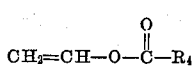

wherein $R_4$ represents an alkyl group containing from 1 to 3 carbon atoms. Typical esters include vinyl formate, vinyl acetate, vinyl propionate, vinyl butyrate, etc.

The monoethylenically unsaturated, polymerizable organic compounds represented by Formulas I and II above include the compounds represented by Formulas III to XV, in addition to other monomeric compounds coming within the scope thereof, such as styrene, α-methylstyrene, p-acetaminostyrene, α-acetoxystyrene, vinyl chloride, vinylidene chloride, ethyl vinyl ether, isopropyl vinyl ether, isopropenyl methyl ketone, ethyl isopropyl ketone, ethyl isopropenyl ketone, methyl vinyl ketone, ethyl vinyl ketone, dimethyl maleate, diethyl maleate, diisopropyl fumarate, acrylic acid, methacrylic acid, fumaronitrile, methacrylonitrile, N-vinyl phthalimide, vinyl butyrate, vinyl sulfonamide, ethylene, isobutylene, etc.

The polymerization is advantageously carried out in an aqueous medium although other reaction media, such as organic solvents, can be employed, for example, a polymerization medium consisting of aqueous acetone, or other aqueous solvent can be used.

The polymerization can be accelerated by heat, by actinic light such as ultraviolet and by the use of well known polymerization catalysts. Such catalysts are commonly used in the art of polymerization, and our invention is not to be limited to any particular catalyst material. Catalysts which have been found to be especially useful comprise the peroxide polymerization catalysts, such as the organic peroxides (e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e.g. alkali metal perborates, such as those of sodium and potassium, etc.), persulfates (e.g. alkali metal ammonium persulfate, etc.), persulfates (e.g. alkali metal ammonium persulfate, etc.). Other catalysts such as the ketazines, azines, etc. can be used. The quantity of catalyst used can be varied, depending on the monomer, amount of diluent, etc.

The temperatures at which the process of our invention can be carried out vary from ordinary room temperature to the reflux temperature of the reaction mixture. Generally a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e.g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e.g. potassium, sodium, etc., bisulfites) can be added to reduce the time required for the polymerization to be effected.

Advantageously, the isolated preformed, modifying homopolymer or interpolymer can be suspended in an aqueous medium containing the polymerization catalyst, and the suspension (or solution) heated for a time (e.g. 30 minutes to 24 hours) prior to the addition of the mixture of acrylonitrile and the other monomer, and the mixture then subjected to polymerizing conditions until from 70% to substantially 100% of the added acrylonitrile and other monomer or monomers have combined with said isolated polymer to form a modified polymer containing from 5 to 95% by weight of combined acrylonitrile. Alternatively, the homopolymer or interpolymer can be added to an aqueous dispersion (solution or emulsion) containing the mixture of acrylonitrile and the other monomer or monomers and polymerization catalyst, and the mixture then subjected to polymerizing conditions. The acrylonitrile and the other monomers and the polymer can also be mixed together, and the mixture added to the medium containing a polymerization catalyst.

Instead of using an aqueous medium in the polymerizations, it is also possible to use organic solvents such as acetonitrile, aromatic hydrocarbons such as benzene, toluene, etc., liquid alkanes such as n-heptane, etc., aliphatic ethers, acetone, etc. Organic solvents which are water-soluble can be used along with water in the polymerization. The term dispersion as used herein is intended to include both true solutions and emulsions.

The polymerizations can also be carried out in continuous manner, especially in the second step of polymerization, i. e., wherein the acrylonitrile and the other polymerizable monomer or monomers are copolymerized in the presence of the isolated homopolymer or interpolymer. The products formed by this method have a number of advantages. They are more homogeneous and have certain improved properties, for example, such as better solubility, as compared with products obtained from analogous batch processes. The continuous polymerizations contemplated herein fall into two main groups: (1) those which are used in equipment which permits the continuous addition of reactants and the continuous removal of product (continuous process) and (2) those which are used in batch reactions wherein one or more of the reactants is added continuously during the course of the polymerization, but from which no material is removed during the reaction (continuous batch process). In the preferred process, acrylonitrile and the other monomer or monomers containing the specified amount of a regulator such as tertiary dodecyl mercaptan is placed in a suitable storage or supply vessel under an atmosphere of nitrogen. In another supply vessel there is placed under nitrogen, air-free deionized water containing the specified amounts of other reactants such as the isolated homopolymer or copolymer obtained by a separate first step of polymerization, the polymerization catalyst and an acidic reagent such as phosphoric acid for adjusting the pH of the reaction mixture. A third vessel contains the reducing agent or activator such as potassium metabisulfite in solution in air-free deionized water.

The preferred procedure is to draw continuously the appropriate amounts of solutions or dispersions from the supply vessels into a reactor, subject the mixture to polymerizing conditions and continuously remove the modified polymer containing from 5 to 95% by weight of combined acrylonitrile from the reactor. By this means 70% or more of the monomers can be converted to the modified polymer. The length of time between the addition of ingredients to the reactor and the removal of the modified polymer is defined as the contact time. At equilibrium, the polymer emulsion or slurry is removed from the reactor by suitable means at the same total rate as ingredients from the supply vessels are being added. Thus, the contact time in the reactor can be conveniently controlled by the absolute rate of addition of the reactants. Usually, the contact time is between 1 and 3 hours, although longer periods in some cases are advantageous. It will be understood, however, that the above process can be varied in a number of ways. For example, the ingredients to be added can be combined or separated by using a larger number of vessels, or as a practical minimum, two storage vessels, one for the activator and one to the other ingredients. Also the other monomer can be added to the reactor separately or in combination with the acrylonitrile or in combination with one or more of the other ingredients.

In the other continuous process, i.e., the continuous batch process, the various ingredients can also be added to the reactor in a number of ways, for example, as follows: (a) the catalyst, activator, acid component, isolated polymer, water, etc., are placed in the reaction vessel, and the monomers and regulator are added continuously; (b) the monomers, regulator, catalyst, acid component, isolated polymer, water, etc., are placed in the reaction vessel and the activator is added continuously; (c) the monomers, regulator, activator, acid component, isolated polymer, water, etc., are placed in the reaction vessel and the catalyst is added continuously; (d) the monomers, regulator, acid component, isolated polymer, water, etc., are placed in the reaction vessel and both catalyst and activator, combined or separate, are added continuously; (e) the isolated polymer, catalyst, acid component and water are placed in the reaction vessel, and the monomers and activator, combined or separate, are added continuously; (f) processes similar to (a) through (e), except that the acid component is eliminated; and (g) processes similar to (a) through (f), except that the activator is eliminated. For further details of the continuous process, reference can be had to copending application of Coover and Shields, Serial No. 407,954, filed of even date herewith.

The following examples will serve to illustrate further the manner whereby we practice our invention.

Example 1

2 grams of polyfumaramide were dissolved in 100 cc. of water containing 0.1 gram of ammonium persulfate, 0.1 gram of potassium disulfite and 7.8 grams of acrylonitrile and .2 gram of vinylacetate. The resulting solution was allowed to polymerize for 16 hours at 25° C. and the resulting polymer was filtered off; after drying there was obtained a product weighing 9.7 grams. It was found to contain 19% by weight of fumaramide on analysis. The polymers can be mixed with polyacrylonitrile in all proportions and dissolved to give stable solutions which do not separate into distinct layers on standing, and from which fibers and films of homogeneous character can be spun, extruded or cast. The fibers obtained by preparing a solution of the polymer obtained above in dimethyl formamide and extruding the solution into a precipitating bath had a tenacity of 3.2 grams per denier, an extensibility of 23%, a sticking temperature of 215° C. and shrank only 7% in boiling water.

Example 2

3 grams of an interpolymer of acrylonitrile and maleamide containing 76% by weight of maleamide were dissolved in 100 cc. of water along with 0.1 gram of ammonium persulfate and 0.1 gram of potassium disulfite. The resulting solution was tumbled end over end for 18 hours at 30° C. and 6.4 grams of acrylonitrile and .6 grams of maleamide were then added and the polymerization allowed to continue for 48 hours at 35° C. The resulting polymer material was precipitated and collected by centrifuging. After drying there was obtained 9.5 grams of polymer material containing 64% by weight of acrylonitrile. The polymer can be mixed with polyacrylonitrile in all proportions and dissolved to give stable solutions which do not separate into distinct layers on standing, and from which fibers and films of homogeneous character can be spun, extruded or cast. Fibers spun by extruding the solution of the polymer in dimethylformamide into a precipitating bath had a tenacity of 3.3 grams per denier, an extensibility of 26%, a sticking temperature of 205° C. and shrank only 9% in boiling water. These fibers showed an excellent affinity for acetate direct, vat and acid dyes, and did not stiffen or stick together in the dye vat.

Example 3

1 gram of polymethylfumaramide was added to 60 cc. of water containing 1 cc. of 7-ethyl-2-methyl undecane-4-sulfonic acid sodium salt (Tergitol No. 4). The mixture was then tumbled end over end for 1 hour at 50° C. The solution was cooled and 7.8 grams of acrylonitrile and 1.2 grams of methylfumaramate and .1 gram of ammonium persulfate and .1 gram of sodium disulfite were added. The polymerization was effected by tumbling for 16 hours at 25° C. The polymer was obtained with a 92% yield and contained 77% by weight of acrylonitrile. Fibers spun by extruding the solution of this polymer in dimethylacetamide into a precipitating bath had a tenacity of 3.8 grams per denier, an extensibility of 33%, a sticking temperature of 210° C. and shrank only 7% in boiling water. Fibers obtained from the solution of the mechanical mixture of 5 parts polyacrylonitrile and 95 parts of the above polymer and extruding the solution into a precipitating bath had a tenacity of 3.7 grams per denier, an extensibility of 32%, a sticking temperature of 215° C. and shrank only 6% in boiling water.

Example 4

3 grams of an interpolymer of N-methylmethylmaleamate and vinyl acetate containing 60% by weight of N-methylmethylmaleamate were dissolved in 50 cc. of a 50% solution of acetonitrile in water. There were then added 5.9 grams of acrylonitrile, .1 gram of N-methylmethylmaleamate, 0.1 gram of ammonium persulfate and 0.1 gram of sodium disulfite. Polymerization was effected by heating for 16 hours at 40° C. The precipitated polymer was obtained in a 92% yield and contained 59% by weight of acrylonitrile, on analysis. Fibers spun by extruding the solution of the polymer in dimethylformamide into a precipitating bath had a tenacity of 3.4 grams per denier, an extensibility of 23%, a sticking temperature of 215° C., and shrank 7% in boiling water. Fibers obtained from a solution of the mechanical mixture of 25 parts of polyacrylonitrile and 75 parts of the above-described polymer and extruding the solution into a precipitating bath had a tenacity of 3.5 grams per denier, an extensibility of 22%, a sticking temperature of 220° C. and shrank only 6% in boiling water.

*Example 5*

2 grams of an interpolymer of N,N-dimethylmethylitaconamate and acrylamide containing 30% by weight of itaconamate were added to 70 cc. of water containing 0.1 gram of sodium disulfite, 0.1 gram of ammonium persulfate, and 8.5 grams of acrylonitrile and 0.5 gram of acrylamide. The resulting mixture was then polymerized for 16 hours at 35° C. The polymer was filtered off and then dried. The polymer contained 84.5 percent by weight of acrylonitrile on analysis. Fibers spun by extruding the solution of this polymer in dimethylformamide into a precipitating bath had a softening point of 215° C., an extensibility of 29%, and showed excellent dye affinity. Fibers obtained from the solution of a mechanical mixture of 10 parts of polyacrylonitrile and 90 parts of the above polymer and extruding the solution into a precipitating bath had a tenacity of 3.1 grams per denier, an extensibility of 22%, a sticking temperature of 215° C. and shrank only 7% in boiling water.

*Example 6*

3 grams of an interpolymer of N,N'-dimethylfumaramide and methylmethacrylate containing 28% by weight of the diamide were emulsified in 100 cc. of water containing 3 cc. of a sulfonated ether (Triton 720). There was then added 6.5 grams of acrylonitrile, .5 gram of N,N'-dimethylfumaramide, 0.15 gram of potassium persulfate and 0.1 gram of sodium disulfite. The resulting emulsion was heated for 12 hours at 35° C. and cooled to room temperature. The precipitated polymer was collected on a filter, washed and dried. It contained 65.1% by weight of acrylonitrile on analysis. Fibers obtained from this polymer product had a sticking temperature of 195° C. The polymer can be mixed with polyacrylonitrile in all proportions and dissolved to give stable solutions which do not separate into distinct layers on standing and from which fibers and films of homogeneous character can be spun, extruded or cast.

*Example 7*

2 grams of poly-N,N'-diisopropylmaleamide were emulsified in 80 cc. of water containing 3 cc. of 7-ethyl-2-methylundecane-4-sulfonic acid sodium salt (Tergitol No. 4). There were then added 7 grams of acrylonitrile, 1 gram of isopropenyl-acetate, 0.1 gram of potassium persulfate and 0.1 gram of sodium disulfite and the emulsion was heated at 35° C. for 16 hours with tumbling. The emulsion was then cooled to room temperature, the precipitated polymer filtered off, washed with distilled water, and dried. It was found to contain 21% by weight of maleamide. Fibers spun by extruding the solution of this polymer in dimethylacetamide into a precipitating bath had a tenacity of 3.8 grams per denier, an extensibility of 37% and shrank only 9% in boiling water. It had a sticking temperature of 220° C. and showed excellent affinity for dyes. The polymer can be mixed with polyacrylonitrile in all proportions and dissolved to give stable solutions which do not separate into distinct layers on standing, and from which fibers and films of homogeneous character can be spun, extruded, or cast.

*Example 8*

3 grams of an interpolymer of N-isopropyl-n-butylitaconamate and methylacrylate containing 80% by weight of itaconamate were dispersed in 100 cc. of water containing 3 cc. of 7-ethyl-2-methylundecane-4-sulfonic acid sodium salt (Tergitol No. 4), 0.1 gram of potassium persulfate, 0.1 gram of sodium bisulfite and 6.5 grams of acrylonitrile and 0.5 gram of N-isopropyl-n-butylitaconamate. The resulting emulsion was then heated for 12 hours at 35° C. The solution was cooled to room temperature and the precipitated polymer filtered off, washed with distilled water and finally dried. It was obtained in a 93% yield and was found to contain 65% by weight of acrylonitrile on analysis. Fibers obtained from this polymer had a sticking temperature of 215° C. and an extensibility of 28%. The polymer can be mixed with polyacrylonitrile in all proportions and dissolved to give stable solutions which do not separate into distinct layers on standing, and from which fibers and films of homogeneous character can be spun, extruded, or cast.

*Example 9*

3 grams of poly-N,N-dimethylisopropylcitraconamate were dispersed in 100 cc. of water containing 3 cc. of 7-ethyl-2-methylundecane-4-sulfonic acid sodium salt (Tergitol No. 4) to which 0.1 gram of ammonium persulfate, 0.1 gram of sodium bisulfite, and 6.9 grams of acrylonitrile and .1 gram of N-methylmetharylamide were added. The resulting solution was heated for 16 hours at 30° C., then cooled to room temperature. The precipitated polymer was filtered off, washed with distilled water, and then dried. It was found to contain 68.5% acrylonitrile on analysis. Fibers were then spun from this product by extruding the solution thereof in dimethylformamide into a precipitating bath. The fibers thus obtained had a tenacity of 3.7 grams per denier, an extensibility of 24%, a sticking temperature of 210° C., and shrank only 7% in boiling water. The polymer can be mixed with polyacrylonitrile in all proportions and dissolved to give stable solutions which do not separate into distinct layers on standing and from which fibers and films of homogeneous character can be spun, extruded or cast.

*Example 10*

9 grams of an interpolymer of N,N-dimethylbutylitaconamate and N-ethylisopropylcitraconamate containing 80% by weight of itaconamate were emulsified in 80 cc. of water containing 3 cc. of 7-ethyl-2-methylundecane-4-sulfonic acid sodium salt (Tergitol No. 4). There was then added 0.9 gram of acrylonitrile, 0.1 gram of N,N-dimethylbutylitaconamate, 0.05 gram of potassium persulfate, 0.05 gram of sodium bisulfite and the emulsion was heated at 35° C. for 16 hours with tumbling. The emulsion was then cooled to room temperature, the precipitated polymer filtered off, washed with distilled water, and dried. A solution of the mechanical mixture of 50 parts polyacrylonitrile and 50 parts of the above polymer was cast to give a clear tough film.

*Example 11*

6 grams of an interpolymer of N-isopropylmethylmaleamate and N-methylisopropylcitraconamate containing 70% by weight of the maleamate were emulsified in 100 cc. of water containing 4 cc. of 7-ethyl-2-methylundecane-4-sulfonic acid sodium salt (Tergitol No. 4). There was then added 3.5 grams of acrylonitrile, 0.5 gram of vinylchloride, 0.1 gram of sodium bisulfite, 0.1 gram of potassium persulfate, and the emulsion was heated at 35° C. for 8 hours with tumbling. The emulsion was then cooled to room temperature, the precipitated polymer filtered off, washed with distilled water, and dried. The polymer was found to contain 35% acrylonitrile by analysis. Fibers obtained from a solution of the mechanical mixture containing 50 parts polyacrylonitrile polymer containing 95% acrylonitrile and 5% vinylacetate and 50 parts of the above polymer and extruding the solution into a precipitating bath had a tenacity of 3.3 grams per denier, an extensibility of 26%, a sticking temperature of 215° C. and shrank only 8% in boiling water.

*Example 12*

2 grams of poly-N-methylacrylamide were dissolved in 100 cc. of water containing 0.1 gram of ammonium persulfate, 0.1 gram of potassium bisulfite, and 7.5 grams of acrylonitrile and 0.5 gram of N-methylacrylamide. The resulting solution was allowed to polymerize for 16 hours at 30° C. and the resulting polymer was filtered off. After drying there was obtained a product weighing 8.7 grams. It was found to contain 74.5% acrylonitrile on analysis. Fibers obtained by preparing the solution of polymer obtained above in dimethylformamide and extruding the solution into a precipitating bath had a tenacity of 3.2 grams per denier, an extensibility of 26%, a sticking temperature of 200° C., and shrank only 10% in boiling water.

*Example 13*

3 grams of an interpolymer of acrylonitrile and N-methylmethacrylamide containing 76% by weight of N-methylmethacrylamide were dissolved in 100 cc. of water along with 0.1 gram of ammonium persulfate and 0.1 gram of potassium bisulfite. The resulting solution was tumbled end over end for 18 hours at 25° C. and 6.1 grams of acrylonitrile and 0.5 gram of N-methylmethacrylamide were then added and the polymerization allowed to continue for 48 hours at 25° C. The resulting polymeric material was precipitated by the addition of acetone and then collected by centrifuging. After drying there were obtained 9.2 grams of polymeric material containing 19.5 percent by weight of N-methylmethacrylamide. Fibers were then spun by extruding the solution of the polymer in dimethylformamide into a precipitating bath. The fibers thus obtained had a tenacity of 3.4 grams per denier, an extensibility of 35%, a sticking temperature of 198° C. and shrank only 7% in boiling water. These fibers showed an excellent affinity for acetate direct, vat and acid dyes, and they did not stiffen or stick together in the dye vat.

*Example 14*

1 gram of poly-N-isopropylacrylamide were added to 60 cc. of water containing 1 cc. of 7-ethyl-2-methylundecane-4-sulfonic acid sodium salt (Tergitol No. 4). The mixture was then tumbled end over end for 1 hour at 50° C. The solution was cooled and 8 grams of acrylonitrile, 0.5 gram of N-isopropylacrylamide, 0.1 gram of ammonium persulfate and 0.1 gram of sodium bisulfite were added. The polymerization was effected by tumbling for 16 hours at 25° C. The polymer was obtained in a 85% yield and contained 79.5% by weight of acrylonitrile on analysis. Fibers spun by extruding the solution of this polymer in dimethylacetamide into a precipitating bath had a tenacity of 3.9 grams per denier, an extensibility of 28%, a sticking temperature of 205° C. and shrank only 7% in boiling water.

*Example 15*

3 grams of an interpolymer of N,N-dimethylacrylamide and vinyl acetate containing 60% by weight of N,N-dimethylacrylamide were dissolved in 50 cc. of the 50% solution of acetonitrile and water. There were then added 5.4 grams of acrylonitrile, 0.4 gram of N-methylmethacrylamide, 0.1 gram of ammonium persulfate and 0.1 gram of sodium bisulfite. The polymerization was effected by heating for 16 hours at 40° C. The precipitated polymer was obtained in a 92% yield and contained 54% by weight of acrylonitrile upon analysis. Fibers spun by extruding the solution of the polymer in dimethylformamide into a precipitating bath had a tenacity of 3.1 grams per denier, an extensibility of 27%, a sticking temperature of 185° C. and shrank 12% in boiling water. The fibers showed an excellent affinity for acetate direct, vat and acid dyes.

*Example 16*

2 grams of an interpolymer of N-methylacrylamide and acrylamide containing 30% by weight of N-methylacrylamide were added to 70 cc. of water containing 0.1 gram of sodium bisulfite, 0.1 gram of ammonium persulfate, 8.1 grams of acrylonitrile, and 0.9 gram of methylmaleamate. The resulting solution was then polymerized for 16 hours at 35° C. The polymer was filtered off and then dried. It was obtained in a 90% yield and was found to contain 81% by weight of acrylonitrile on analysis. Fibers spun by extruding the solution of this polymer in dimethylformamide into a precipitating bath had a softening point of 200° C., an extensibility of 28%, and showed excellent dye affinity.

*Example 17*

2 grams of poly-N,N'-dimethylitaconic acid diamide were emulsified in 80 cc. of water containing 3 cc. of 7-ethyl-2-methylundecane-4-sulfonic acid sodium salt (Tergitol No. 4). There were then added 7.2 grams of acrylonitrile, 0.8 gram of vinyl acetate, 0.1 gram of potassium persulfate, and 0.1 gram of sodium bisulfite and the emulsion was heated at 35° C. for 16 hours with tumbling. The emulsion was then cooled to room temperature, the precipitated polymer filtered off, washed with distilled water and dried. It was found to contain 21% by weight of N,N-dimethylitaconic diamide and it was obtained in a 92% yield. Fibers spun by extruding the solution of this polymer in dimethylacetamide into a precipitating bath had a tenacity of 3.8 grams per denier, an extensibility of 26%, and shrank only 9% in boiling water. It had a sticking temperature of 205° C. and showed excellent affinity for dyes.

*Example 18*

3 grams of an interpolymer of acrylamide and methyl acrylate containing 80% by weight of acrylamide were dissolved in 100 cc. of water containing 0.1 gram of potassium persulfate, 0.1 gram of sodium bisulfite, 6.5 grams of acrylonitrile and .5 gram of acrylamide. The resulting solution was then heated for 16 hours at 35° C. The solution was cooled to room temperature and the precipitated polymer filtered off, washed with distilled water, and finally dried. It was obtained in a 95% yield and was found to contain 65% by weight of acrylonitrile on analysis. Fibers obtained from this polymer had a sticking temperature of 205° C. and an extensibility of 26 percent.

*Example 19*

3 grams of poly-N-methyl methacrylamide were dissolved in 100 cc. of water to which 0.1 gram of ammonium persulfate, 0.1 gram of sodium bisulfite, 6.9 grams of acrylonitrile and 0.1 gram of dimethylmaleate were added. The resulting solution was heated for 16 hours at 30° C., then cooled to room temperature. The precipitated polymer was filtered off, washed with distilled water and then dried. It was found to contain 68.9% by weight of acrylonitrile on analysis. Fibers were then spun from this product by extruding the solution thereof in a dimethylformamide into a precipitating bath. The fibers thus obtained had a tenacity of 3.7 grams per denier, an extensibility of 22%, a sticking temperature of 200° C., and shrank only 7% in boiling water.

Example 20

One gram of polycitraconamide was added to 60 cc. of water containing one cc. of 7-ethyl-2-methylundecane-4-sulfonic acid sodium salt (Tergitol No. 4). The mixture was then tumbled end over end for one hour at 50° C. The emulsion was cooled and 8.4 grams of acrylonitrile, 0.1 gram of methyl methacrylate, 0.1 gram of ammonium persulfate and 0.1 gram of sodium bisulfite were added. The polymerization was effected by tumbling for 16 hours at 35° C. The polymer was obtained in a 96% yield and contained 84% acrylonitrile by weight based on analysis. Fibers spun by extruding the solution of this polymer in dimethylacetamide into a precipitating bath had a tenacity of 3.6 grams per denier, an extensibility of 21%, a sticking temperature of 210° C., and shrank only 6% in boiling water.

Example 21

One gram of polyvinylacetate was added to 60 cc. of water containing two cc. of 7-ethyl-2-methylundecane-4-sulfonic acid sodium salt (Tergitol No. 4). The mixture was then tumbled end over end for 2 hours at 45° C. The solution was cooled and 8.5 grams of acrylonitrile, 0.5 gram of methylacrylate, 0.1 gram of ammonium persulfate and 0.1 gram of sodium bisulfite were added. The polymerization was effected by tumbling for 16 hours at 35° C. The polymer was obtained in a 97% yield and contained 85% by weight of acrylonitrile on analysis. Fibers spun by extruding the solution of this polymer in dimethylacetamide into a precipitating bath had a tenacity of 3.6 grams per denier, an extensibility of 25%, a sticking temperature of 210° C. and shrank only 6% in boiling water.

Example 22

Two grams of poly-N-isopropylacrylamide was dissolved in 118 cc. of water containing 0.1 g. of ammonium persulfate, 0.1 g. of potassium bisulfite. There was then added 7.8 g. of acrylonitrile and 0.2 g. of vinyl acetate. The resulting solution was allowed to polymerize for 16 hours at 30° C. and a resulting polymer was filtered off. After drying, the acrylonitrile and vinyl acetate had polymerized to 70% conversion. The polymers can be mixed with polyacrylonitrile or with copolymers of acrylonitrile containing 85% or more acrylonitrile in all proportions and dissolved to give stable solutions which do not separate into distinct layers on standing and from which fibers and films of homogeneous character can be spun, extruded or cast.

The fibers obtained by preparing a solution of the polymer obtained above in dimethylacetamide and extruding the solution into a precipitating bath had a tenacity of 3.6 g. per denier, extensibility of 27%, a sticking temperature of 210° C. and shrank only 6% in boiling water.

Example 23

Nine grams of an interpolymer of N,N-dimethylbutylitaconamate and N-ethylisopropylcitraconamate containing 80% by weight of itaconamate were emulsified in 80 cc. of water containing 3 cc. of 7-ethyl-2-methyl-1-decane-4-sulfonic acid sodium salt (Tergitol No. 4). There was then added 0.9 g. of acrylonitrile, 0.1 g. of N,N-dimethylbutylitaconamate, 0.05 g. of potassium persulfate, and 0.05 g. of sodium bisulfite, and the emulsion was heated at 35° C. for several hours until the monomers had polymerized to a conversion of 90%. The emulsion was then cooled to room temperature, precipitated polymer filtered off, washed with distilled water and dried. A solution of the mechanical mixture of 50 parts of a copolymer of acrylonitrile containing 90% acrylonitrile and 10% methacrylate and 50 parts of the above polymer was cast to give a clear, tough film.

Example 24

Two grams of poly-N-methacrylamide was dissolved in 100 cc. of water containing 0.1 g. of ammonium persulfate, 0.1 g. of potassium bisulfite and 7.5 g. of acrylonitrile, and 0.5 g. of N-methylacrylamide. The resulting solution was allowed to polymerize for several hours at 30° C., at the end of which time the monomer had polymerized to 85% conversion based on analysis. The polymer had excellent solubility properties in dimethylformamide and extruding the solution into a precipitating bath gave fibers which after drafting had a tenacity of 3.4 g. per denier, an extensibility of 28%, a sticking temperature of 205° C. and shrank only 8% in boiling water.

Example 25

Three grams of an interpolymer of acrylonitrile and N-methylmethacrylamide containing 70% by weight of N-methylmethacrylamide was dissolved in 100 cc. of water along with 0.1 g. of ammonium persulfate and 0.1 g. of potassium bisulfite. The resulting solution was tumbled end over end for several hours at 25° C. and 6.5 g. of acrylonitrile and 0.5 g. of N-methylmethacrylamide were then added and the polymerization was allowed to continue for several hours at 25° C., at the end of which time the monomers had polymerized to a conversion of 81% based on analysis. The resulting polymer was precipitated by the addition of acetone and then collected by centrifuging. After drying, the polymeric material showed excellent solubility in such solvents as γ-butyrolactone, N,N-dimethylformamide and N,N-dimethylacetamide. Fibers spun by extruding a solution of the polymer in dimethylformamide into a precipitating bath followed by drafting had a tenacity of 3.4 g. per denier, an extensibility of 35%, a sticking temperature of 198° C. and shrank only 7% in boiling water. These fibers showed an excellent affinity for acetate, direct, vat and acid dyes. They did not stiffen or stick together in the dye bath.

Example 26

Three grams of an interpolymer of N,N-dimethylacrylamide and vinyl acetate containing 60% by weight of N,N-dimethylacrylamide was dissolved in 50 cc. of a 50% solution of acetonitrile in water. There was then added 5.4 g. of acrylonitrile, 0.2 g. of N-methylmethacrylamide, 0.2 g. of vinyl acetate, 0.1 g. of ammonium persulfate and 0.1 g. of sodium bisulfite. The polymerization was effected by heating for several hours at 40° C. The polymerization had receded to a conversion of 87% based on analysis. The precipitated polymer was obtained in an 87% yield and was readily soluble in such solvents as dimethylformamide and dimethylacetamide. The fiber was spun by extruding the solution of the polymer in dimethylformamide into a precipitating bath at a tenacity of 3.2 g. per denier, an extensibility of 28%, a sticking temperature of 195° C. and shrank 11% in boiling water.

Example 27

One gram of polyvinyl acetate was added to 60 cc. of water containing 2 cc. of 7-ethyl-2-methyl-1-decane-4-sulfonic acid sodium salt (Tergitol No. 4). The mixture was then tumbled end over end for 2 hours at 45° C. The solution was cooled and 8.5 g. of acrylonitrile, 0.3 g. of methacrylate, 0.2 g. of vinyl acetate, 0.1 g. of ammonium persulfate and 0.1 g. of sodium bisulfite were added. The polymerization was effected by tumbling for several hours at 35° C. Polymerization had receded to a conversion of 73% based on analysis. Fibers spun by extruding a solution of this polymer in dimethylacetamide into a precipitating bath had a tenacity of 3.6 g. per denier, an extensibility of 26%, a sticking temperature of 210° C. and shrank only 6% in boiling water.

Example 28

2 g. of poly-N-isopropylamide were dissolved in 118 cc. of water. There were then added 8 g. of acrylonitrile, 0.1 g. of potassium persulfate and 0.1 g. of potassium metabisulfite and the mixture was allowed to polymerize at 35° to 75% conversion. The polymer product was then immediately separated from the reaction mixture by filtration yielding 8 g. of polymer containing approximately 80% by weight of combined acrylonitrile. This product was insoluble in most of the common solvents, but was readily soluble in such solvents as N,N-dimethylformamide, N,N-dimethylacetamide and gamma-butyrolactone to give clear, gel-free solutions. Fibers obtained by extruding a solution of the polymer into a precipitating bath had good physical properties.

*Example 29*

2 g. of an interpolymer of acrylonitrile and N-methyl methacrylamide containing 30% by weight of the amide and 70% by weight of the nitrile were dissolved in 118 cc. of water. There were then added 8 g. of acrylonitrile, 0.1 g. of potassium persulfate and 0.1 g. of potassium metabisulfite and the mixture allowed to polymerize at 35° C. to 85% conversion. The polymer product was then immediately separated from the reaction mixture by filtration yielding 8.8 g. of polymer containing approximately 94% by weight of combined acrylonitrile. The polymer was insoluble in most of the common solvents, but was readily soluble in such solvents as N,N-dimethylformamide, N,N-dimethylacetamide and gamma-butyrolactone to give clear, gel-free solutions. Fibers obtained by extruding a solution of the polymer into a precipitating bath had good physical properties.

The preceding description and examples have set forth that the resinous compositions or polymers of the invention which contain from 60 to 95 percent by weight of acrylonitrile in the polymer molecule are especially useful for preparing fibers from their solutions or dopes in the mentioned solvent by wet or dry spinning processes. Good quality fibers can also be spun from dopes comprising a mixture of one or more of the resinous compositions of the invention with polyacrylonitrile, when used in such proportions that the combined total of acrylonitrile in the mixture of components is in the range of 60 to 95 percent by weight. However, all of the resinous compositions or polymers of the invention, containing from 5 to 95 percent of acrylonitrile, including the mixtures of them with polyacrylonitrile in any proportions but preferably in the proportions of from 5 to 95 parts by weight of one or more of the polymers of the invention and from 95 to 5 parts by weight of polyacrylonitrile, can be made up into solutions or dopes with one or more acrylonitrile polymer solvents, with or without added fillers, pigments, dyes, plasticizers, etc., as desired, and the dopes coated onto a smooth surface to give flexible and tough films and sheet materials, which are useful for photographic film support and other purposes.

Other solvents which can be used for the preparation of fibers and coating compositions, etc., from the new resinous compositions or polymers of the invention, and mixtures thereof with each other, with polyacrylonitrile or with acrylonitrile polymers containing 85 percent or more of acrylonitrile, include ethylene carbonate, ethylene carbamate, -butyrolactone, N-methyl 2-pyrrolidone, N,N-dimethyl cyanamide, N,N-dimethyl cyanoacetamide, N,N-dimethyl-β-cyanopropionamide, glycolonitrile (formaldehyde cyanohydrin), malonitrile, ethylene cyanohydrin, dimethylsulfoxide, dimethyl sulfone, tetramethylene sulfone, tetramethylene sulfoxide, N-formyl pyrrolidine, N-formyl morpholine, N,N'-tetramethylene methanephosphonamide, and the like. Generally speaking, we have found that N,N-dimethyl formamide and N,N-dimethyl acetamide are particularly advantageous solvents. The amount of our new resinous compositions in such solvents can be varied from 25 to 40 percent or even higher in some cases, such solutions or dopes being especially well adapted to practical spinning operations.

In practicing this invention a particularly valuable group of modified polymers is prepared by using a vinylpyridine monomer as the monomer containing a —CH=C< group. This is particularly true when a vinylpyridine monomer is employed to form the initial preformed isolated copolymer by copolymerizing a vinylpyridine with any of the 13 modifying monomers which have been set out in the structural formulas hereinabove. Any of the vinylpyridine monomers can be employed including the unsubstituted vinylpyridines such as 2-vinylpyridine and 4-vinylpyridine as well as the substituted vinylpyridines containing one or more alkyl groups of from one to four carbon atoms substituted on the pyridine ring. Typical of these substituted pyridines are 2-vinyl-6-methylpyridine and 2-methyl-5-vinylpyridine although any of the other well known alkyl substituted vinylpyridines can be employed. A particularly useful class of modified polymers are obtained by polymerizing a mixture of acrylonitrile and another monomer as described with an isolated preformed copolymer of a vinylpyridine with an acrylamide or methacrylamide. Such modified polymers exhibit the same desirable characteristics as the modified polymers previously described and also exhibit excellent light fastness when dyed with acetate, wool, direct or vat dyes. Modified polymers of this type are illustrated by the following additional examples:

*Example 30*

10 g. of a 40/60 fumaramide 2-methyl-5-vinylpyridine copolymer was added with stirring to 450 ml. of water containing 1.0 g. of sodium lauryl sulfate. After the emulsion became homogeneous there was added 29 g. of acrylonitrile, 1.0 g. of 2-methyl-5-vinylpyridine, 0.3 g. of potassium persulfate and 0.3 g. of potassium metabisulfite. The polymerization mixture was heated at 35° C. for 15 hours. The resultant precipitated polymer was isolated by filtration. It was readily soluble in dimethylformamide and could be spun into fibers having a tenacity of 2.4 g./d.

*Example 31*

3 g. of a 90/10 copolymer of N-isopropylacrylamide and 2-methyl-5-vinylpyridine was added with stirring to 150 ml. of water containing 0.3 g. of sodium lauryl sulfate. After the emulsion became homogeneous there was added 9.6 g. of acrylonitrile, 0.4 g. of N-isopropylacrylamide, 0.15 g. of potassium persulfate and 0.10 g. of potassium metabisulfite, and the mixture was allowed to polymerize at 35° C. for 15 hours. The resultant polymer was soluble in dimethylformamide and could be spun into fibers which had excellent alkali stability and a high affinity for all classes of dyes. The dyed fiber had excellent resistance to fading.

*Example 32*

3 g. of a 90/10 copolymer of N-methylmethacrylamide and 2-methyl-5-vinylpyridine was added with stirring to 150 ml. of water containing 0.3 g. of sodium lauryl sulfate. After the emulsion became homogeneous there was added 9.5 g. of acrylonitrile, 0.5 g. of N-methylmethacrylamide, 0.1 g. of potassium persulfate, and 0.15 g. of potassium metabisulfite, and the mixture was allowed to polymerize at 35° C. for 15 hours. The resultant polymer was soluble in dimethylformamide and could be spun into fibers which had a tenacity of 2.5 g./d. and which had high affinity for all classes of dyes. The dyed fibers were resistant to fading.

These and similar modified polymers prepared in accordance with this invention contain at least five percent by weight of combined acrylonitrile and preferably in excess of 50 percent combined acrylonitrile. All of these modified polymers show greatly improved mechanical and dyeing properties as compared to polyacrylonitrile polymers.

The invention has been described in considerable detail with particular reference to certain preferred embodiments thereof, but it will be understood that variations and modi-

What we claim is:

1. A process for preparing a resinous fiber-forming graft copolymer which comprises heating a graft copolymerization reaction mixture comprising (1) water, (2) from 60 to 95 parts by weight of a monomer mixture consisting of from 85.0 to 99.5% by weight of acrylonitrile and from 15.0 to 0.5% by weight of a monomer represented by the general formulas:

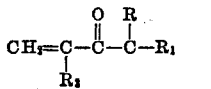

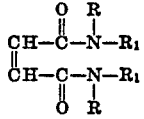

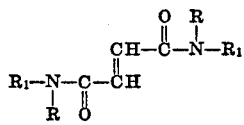

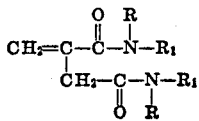

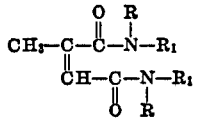

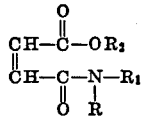

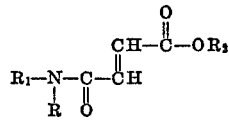

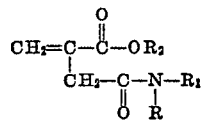

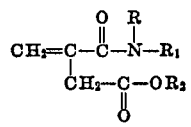

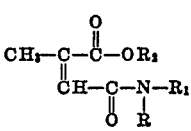

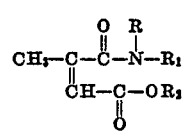

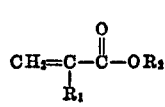

and

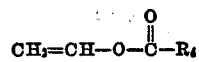

wherein R and $R_1$ each represents a member selected from the group consisting of a hydrogen atom and an alkyl group containing from 1 to 4 carbon atoms, $R_2$ represents an alkyl group containing from 1 to 4 carbon atoms, $R_3$ represents a member selected from the group consisting of a hydrogen atom and a methyl group and $R_4$ represents an alkyl group containing from 1 to 3 carbon atoms, (3) a peroxide polymerization catalyst and (4) from 40 to 5 parts by weight of a previously isolated polymer selected from the group consisting of (a) a homopolymer of a compound represented by the general formula:

wherein one of R and $R_1$ represents an alkyl group containing from 1 to 4 carbon atoms, the other of R and $R_1$ represents a member selected from the group consisting of a hydrogen atom and an alkyl group containing from 1 to 4 carbon atoms and $R_2$ represents a member selected from the group consisting of a hydrogen atom and a methyl group, and (b) a copolymer of from 60 to 80% by weight of a compound represented by the above general formula:

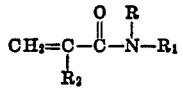

wherein R and $R_1$ each represents a member selected from the group consisting of a hydrogen atom and an alkyl radical containing from 1 to 4 carbon atoms and $R_2$ represents a member from the group consisting of a hydrogen atom and a methyl group and from 40 to 20% by weight of acrylonitrile, until from 70% to approximately 100% of the said monomers have combined with the said isolated polymer to give the said graft copolymer.

2. A resinous fiber-forming graft copolymer obtained according to the process of claim 1.

3. A process for preparing a resinous fiber-forming graft copolymer which comprises heating a graft copolymerization reaction mixture comprising (1) water, (2) from 60 to 95 parts by weight of a monomer mixture consisting of from 85.0 to 99.5% by weight of acrylonitrile and from 15.0 to 0.5% by weight of N-isopropylacrylamide, (3) a peroxide polymerization catalyst and (4) from 40 to 5 parts by weight of previously isolated poly-N-isopropylacrylamide, until from 70% to approximately 100% of the said monomers have combined with the said isolated poly-N-isopropylacrylamide to give the said graft copolymer.

4. A resinous fiber-forming graft copolymer obtained according to the process of claim 3.

5. A process for preparing a resinous fiber-forming graft copolymer which comprises heating a graft copolymerization reaction mixture comprising (1) water, (2) from 60 to 95 parts by weight of a monomer mixture consisting of from 85.0 to 99.5% by weight of acrylonitrile and from 15.0 to 0.5% by weight of N-methyl methacrylamide, (3) a peroxide polymerization catalyst and (4) from 40 to 5 parts by weight of previously isolated poly-N-methyl methacrylamide, until from 70% to approximately 100% of the said monomers have combined with the said isolated poly-N-methyl methacrylamide to give the said graft copolymer.

6. A resinous fiber-forming graft copolymer obtained according to the process of claim 5.

7. A process for preparing a resinous fiber-forming graft copolymer which comprises heating a graft copolymerization reaction mixture comprising (1) water, (2) from 60 to 95 parts by weight of a monomer mixture consisting of from 85.0 to 99.5% by weight of acrylonitrile and from 15.0 to 0.5% by weight of N-methyl methacrylamide, (3) a peroxide polymerization catalyst and (4) from 40 to 5 parts by weight of a previously isolated copolymer of 60 to 80% by weight of N-methyl methacrylamide and 40 to 20% by weight of acrylonitrile, until from 70% to approximately 100% of the said monomers have combined with the said isolated copolymer to give the said graft copolymer.

8. A resinous fiber-forming graft copolymer obtained according to the process of claim 7.

References Cited in the file of this patent

UNITED STATES PATENTS

| | | |
|---|---|---|
| 2,067,234 | Gordon et al. | Jan. 12, 1937 |
| 2,123,599 | Fikentscher et al. | July 12, 1938 |
| 2,133,257 | Strain | Oct. 11, 1938 |
| 2,140,048 | Fikentscher et al. | Dec. 13, 1938 |
| 2,311,548 | Jacobson et al. | Feb. 16, 1943 |
| 2,620,324 | Coover et al. | Dec. 2, 1952 |
| 2,749,325 | Craig | June 5, 1956 |

FOREIGN PATENTS

| | | |
|---|---|---|
| 679,562 | Great Britain | Sept. 17, 1952 |
| 999,594 | France | Oct. 3, 1951 |

UNITED STATES PATENT OFFICE
Certificate of Correction

March 24, 1959

Patent No. 2,879,254     Harry W. Coover, Jr., et al.

It is hereby certified that error appears in the printed specification of the above numbered patent requiring correction and that the said Letters Patent should read as corrected below.

Column 7, line 50, for "to the" read —for the—; column 13, line 71, for "methacrylate" read —methylacrylate—; line 75, for "poly-N-methacrylamide" read —poly-N-methylacrylamide—; column 14, line 18, for "bisulfate" read —bisulfite—; line 63, for "methacrylate" read —methylacrylate—; column 17, lines 12 to 15, claim 1, the first formula should appear as shown below instead of as in the patent:

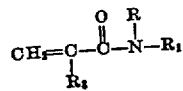

Signed and sealed this 18th day of August 1959.

[SEAL]

Attest:
KARL H. AXLINE,
*Attesting Officer.*

ROBERT C. WATSON,
*Commissioner of Patents.*